(12) United States Patent
Gibson et al.

(10) Patent No.: US 8,567,597 B2
(45) Date of Patent: Oct. 29, 2013

(54) COMPARTMENTED CONTAINER FOR SNUS

(75) Inventors: Paul Gibson, London (GB); Aaron McKenzie, London (GB)

(73) Assignee: British American Tobacco (Investments) Limited, London (GB)

( * ) Notice: Subject to any disclaimer, the term of this patent is extended or adjusted under 35 U.S.C. 154(b) by 0 days.

(21) Appl. No.: 13/139,107

(22) PCT Filed: Oct. 30, 2009

(86) PCT No.: PCT/EP2009/064363
§ 371 (c)(1),
(2), (4) Date: Aug. 29, 2011

(87) PCT Pub. No.: WO2010/066510
PCT Pub. Date: Jun. 17, 2010

(65) Prior Publication Data
US 2011/0303566 A1 Dec. 15, 2011

(30) Foreign Application Priority Data
Dec. 12, 2008 (GB) .................................. 0822657.3

(51) Int. Cl.
*A24F 23/00* (2006.01)
*B65D 51/16* (2006.01)
*B65D 69/00* (2006.01)
*B65D 85/10* (2006.01)

(52) U.S. Cl.
USPC .......... 206/236; 206/37; 206/242; 220/359.1; 220/522; 220/527

(58) Field of Classification Search
USPC ............................ 206/37, 38, 236, 242, 265; 220/359.1–359.4, 521, 522, 527
See application file for complete search history.

(56) References Cited

U.S. PATENT DOCUMENTS

| | | | |
|---|---|---|---|
| 3,055,808 A | 9/1962 | Henderson | |
| 3,961,721 A | 6/1976 | Gordon et al. | |
| 4,098,421 A * | 7/1978 | Foster | 215/321 |
| 4,340,138 A * | 7/1982 | Bernhardt | 220/521 |
| 4,804,101 A * | 2/1989 | Heath | 206/236 |
| 5,752,599 A * | 5/1998 | Veltman | 206/236 |
| 5,769,263 A | 6/1998 | Willingham et al. | |
| 5,938,018 A * | 8/1999 | Keaveney et al. | 206/261 |
| 7,011,228 B2 | 3/2006 | Ordiway | |
| 7,798,319 B1 * | 9/2010 | Bried et al. | 206/242 |
| 7,878,324 B2 * | 2/2011 | Bellamah et al. | 206/236 |

(Continued)

FOREIGN PATENT DOCUMENTS

| | | |
|---|---|---|
| CL | 131-1998 | 12/1998 |
| CL | 052-2001 | 11/2001 |

(Continued)

OTHER PUBLICATIONS

International Search Report and Written Opinion corresponding to PCT/EP2009/064363 mailed Jan. 25, 2010.

(Continued)

*Primary Examiner* — Bryon Gehman
(74) *Attorney, Agent, or Firm* — N W Poulsen (57) ABSTRACT

A container for snus is disclosed. It comprises two portions that together define a resealable compartment for holding snus, wherein the two portions are attachable to each other by non-permanent reusable adhesive to close the compartment.

24 Claims, 7 Drawing Sheets

(56) References Cited

U.S. PATENT DOCUMENTS

| | | | |
|---|---|---|---|
| 8,117,807 B2* | 2/2012 | Bellamah et al. | 206/236 |
| 8,215,482 B2* | 7/2012 | Cronin et al. | 206/236 |
| 2008/0202956 A1* | 8/2008 | Welk et al. | 206/265 |
| 2009/0014450 A1* | 1/2009 | Bjorkholm | 220/521 |
| 2009/0230003 A1* | 9/2009 | Thiellier | 206/265 |
| 2010/0000888 A1* | 1/2010 | Cronin et al. | 206/265 |
| 2010/0018882 A1* | 1/2010 | St. Charles | 206/242 |

FOREIGN PATENT DOCUMENTS

| | | |
|---|---|---|
| CL | 2469-2003 | 9/2004 |
| CL | 190-2004 | 11/2004 |
| CL | 483-2008 | 4/2008 |
| EP | 1930253 A1 | 6/2008 |
| GB | 2291864 A | 2/1996 |
| WO | 0151378 | 7/2001 |
| WO | WO2005016036 A1 | 2/2005 |
| WO | WO2006096117 A1 | 9/2006 |
| WO | WO2008135468 A1 | 11/2008 |

OTHER PUBLICATIONS

International Preliminary Report on Patentability corresponding to PCT/EP2009/064363 mailed Nov. 16, 2010.

Office Action, received Jan. 24, 2013, for corresponding application CL2011-001387, filed Jun. 8, 2011.

* cited by examiner

COMPARTMENTED CONTAINER FOR SNUS

The present invention relates to a container for tobacco products, preferably smokeless products and most preferably snus.

Current packaging for tobacco products such as snus and snuff comprises a container formed from a base and a lid. It is important that the contact between the lid and the base is sufficiently close so that the container remains substantially airtight so that the tobacco products retain their freshness.

A problem with conventional containers is that the contact between the lid and the base is not sufficiently close and so the contents degrade over time. Although the contact between the base and the lid may initially be sufficiently close, the contact or seal may become worn or damaged after repeated removal and replacement of the lid. It is therefore desirable to provide a container in which the tightness of the lid and base is maintained despite repeated opening of the container.

It is also known from WO 2005/016036 A1 and WO 2006/096117 to provide a container for holding fresh snus with a separate compartment for temporarily receiving consumed snus. The cover may either be connected to the lid via a hinge or, be clipped onto the cover so that it is completely removable to gain access to the disposal compartment.

In containers having a separate disposal compartment, it is also desirable to maintain close contact between the cover and the lid so as to fully enclose the used snus and prevent odour or used snus from escaping from the disposal compartment. However, the contact or seal between the cover and the lid often becomes worn or damaged during repeated removal or opening of the cover.

The present invention seeks to provide a container for snus that overcomes or substantially alleviates the problems mentioned above.

According to the invention, there is provided a container comprising two portions that together define a resealable compartment for holding snus, wherein the two portions are attachable to each other by non-permanent reusable adhesive to close said compartment.

Preferably, at least a region of a surface of one portion includes a layer of re-usable adhesive to allow the other portion to be resealably adhered to the other portion.

In one embodiment, one portion is flexible to enable it to be peeled from the other portion.

In an alternative embodiment, both portions are substantially rigid.

Preferably, a flexible film is disposed between the two portions and is releasably attached to one of said portions using said adhesive.

In one embodiment, the two portions comprise a base and a lid together defining a compartment for fresh snus.

In an alternative embodiment, the two portions comprise a lid and a cover defining a compartment for used snus, the container further comprises a base to which the lid is releasably attached.

The base and the lid may also be attachable to each other by a re-usable non-permanent adhesive.

In one embodiment, the base comprises a bottom and a peripheral wall with an inner surface which is lined with a plastic component extending beyond said wall.

Conveniently, the lid is retained on the base by the lid frictionally engaging with the extending part of the plastic component.

In one embodiment, the two portions comprise a lid and a base defining a compartment for storing fresh snus, the container further comprises a cover attachable to the lid to cover a second compartment for storing used snus.

Preferably, the cover is attachable to the lid by re-usable adhesive.

Conveniently, the lid comprises a central recess defining the second compartment for used snus.

In one embodiment, the central recess is encircled by lip to which the cover is releasably attached by a re-usable non-permanent adhesive.

The lip may be recessed, having a depth less than that of said central recess and configured to receive the cover flush with the surface of the lid.

In one embodiment, the second compartment comprises a plurality of compartments.

Conveniently, the cover comprises a plurality of corresponding portions so as to cover the plurality of compartments in the secondary storage space.

Embodiments of the present invention will now be described by way of example only, with reference to the accompanying drawings, in which.

Figure 1:
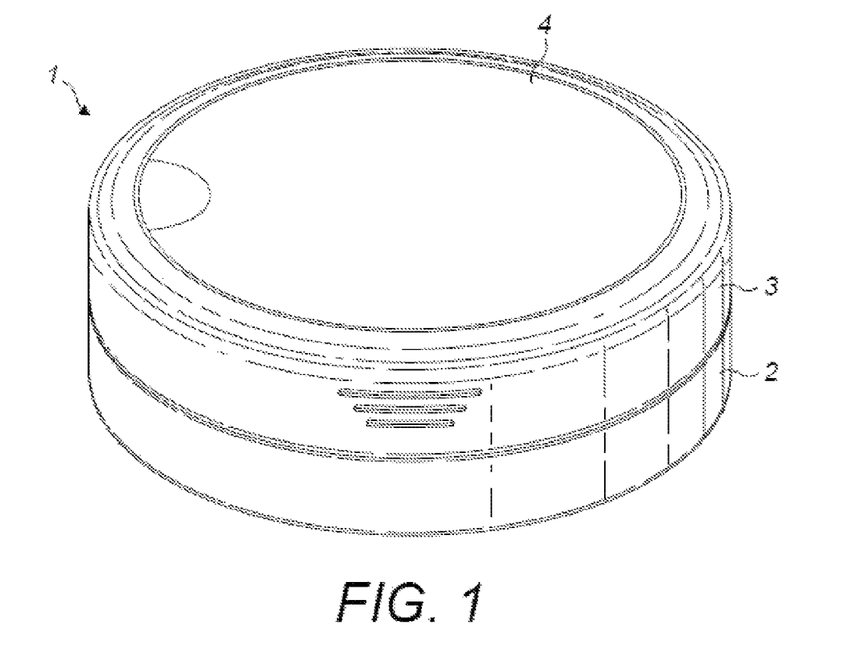
FIG. 1 shows a perspective view of a snus container according to the present invention.
Figure 2:
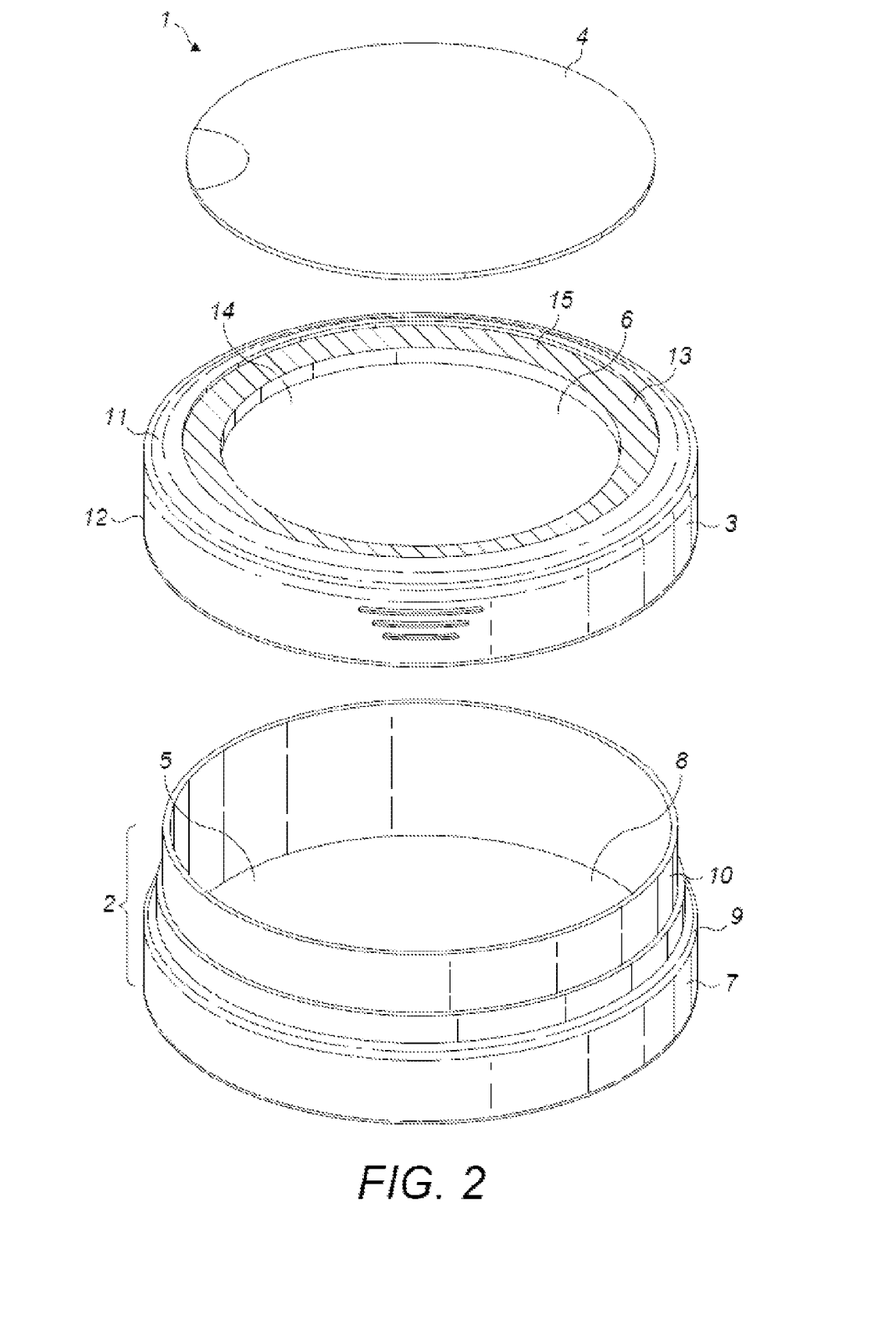
FIG. 2 shows an exploded view of the three components of the snus container of FIG. 1.

Referring now to the drawings, there is shown in FIGS. 1 and 2 a container 1 comprising a housing 2, a lid 3 and a cover 4. The housing 2 and the lid 3 define a main storage space 5 for holding fresh snus. The lid 3 and the cover 4 define a secondary storage space 6 for holding consumed snus.

The housing 2 comprises a base 7 having a bottom 8 and a side wall 9 which circumferentially extends upwards from the bottom 8, a plastic component or ring 10 which is provided within the base 7 and aligned with the side wall 9 of the base 7 so that the outer diameter of the ring 10 is equal to the inner diameter of the side wall 9 of the base. The ring 10 is designed to extend beyond the height of the side wall 9 of the base for reasons described below. In one embodiment, the ring 10 may be integrally formed with the side wall 9.

The lid 3 includes a side wall 12 which depends downwardly from a top surface 11 of the lid 3. The thickness of the side wall 12 and the diameter of the top 11 are of similar dimensions as the side wall 9 and bottom 8, respectively, of the base 7. The container 1 is closed as the lid 3 receives the ring 10 so that the side wall 12 overlaps the ring 10 of the base 7, thereby closing the space 5 defined therein. It is envisaged that the base 7 and the lid 3 of the container are manufactured by pressed metal or plastic. The container may rely on friction between the lid 3 and the ring 10 to maintain the seal. However, in a preferred embodiment, a non-permanent adhesive is used that retains its stickiness through repeated separations of the lid 3 from the base 7.

Figure 7:
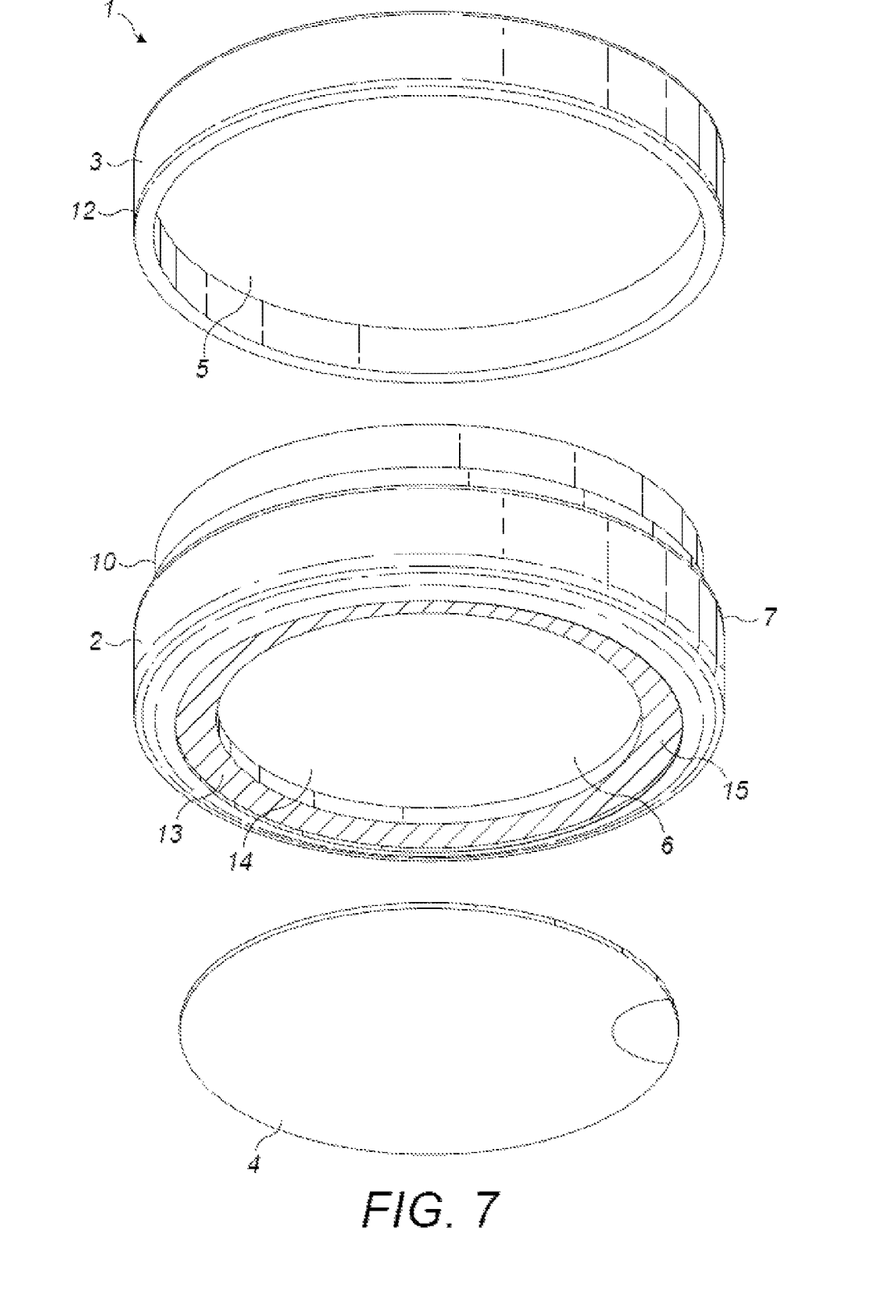
FIG. 7 shows a perspective view of a snus container according to an embodiment of the present invention.

Although the container of the invention may have only a single compartment, in another embodiment, the container has a separate disposal compartment formed in either the lid 3 (e.g., as shown in FIG. 2) or the base 7 (e.g., as shown in FIG. 7), which is closed by a cover 4. If the disposal compartment is formed in the lid 3, the top 11 of the lid 3 further comprises a central recess 14 providing said disposal compartment and an annular recessed lip 13 for receiving the cover as seen in FIG. 2. The lip 13 is of a depth similar to the thickness of the cover 4 so that by positioning the cover 4 on the lip 13 a flush outer finish of the lid 3 is produced. The diameter of the cover 4 is slightly smaller than the outer diameter of the lip 13 so that the cover is only contacting the lip and forms a gap between an edge of the cover and the lid 3 to assist in the removal of the cover 4. When the cover 4 is placed on the recessed lip 13 a secondary storage space 6 for holding or storing consumed snus is defined by the central recess 14 and the cover 4.

Figure 3:
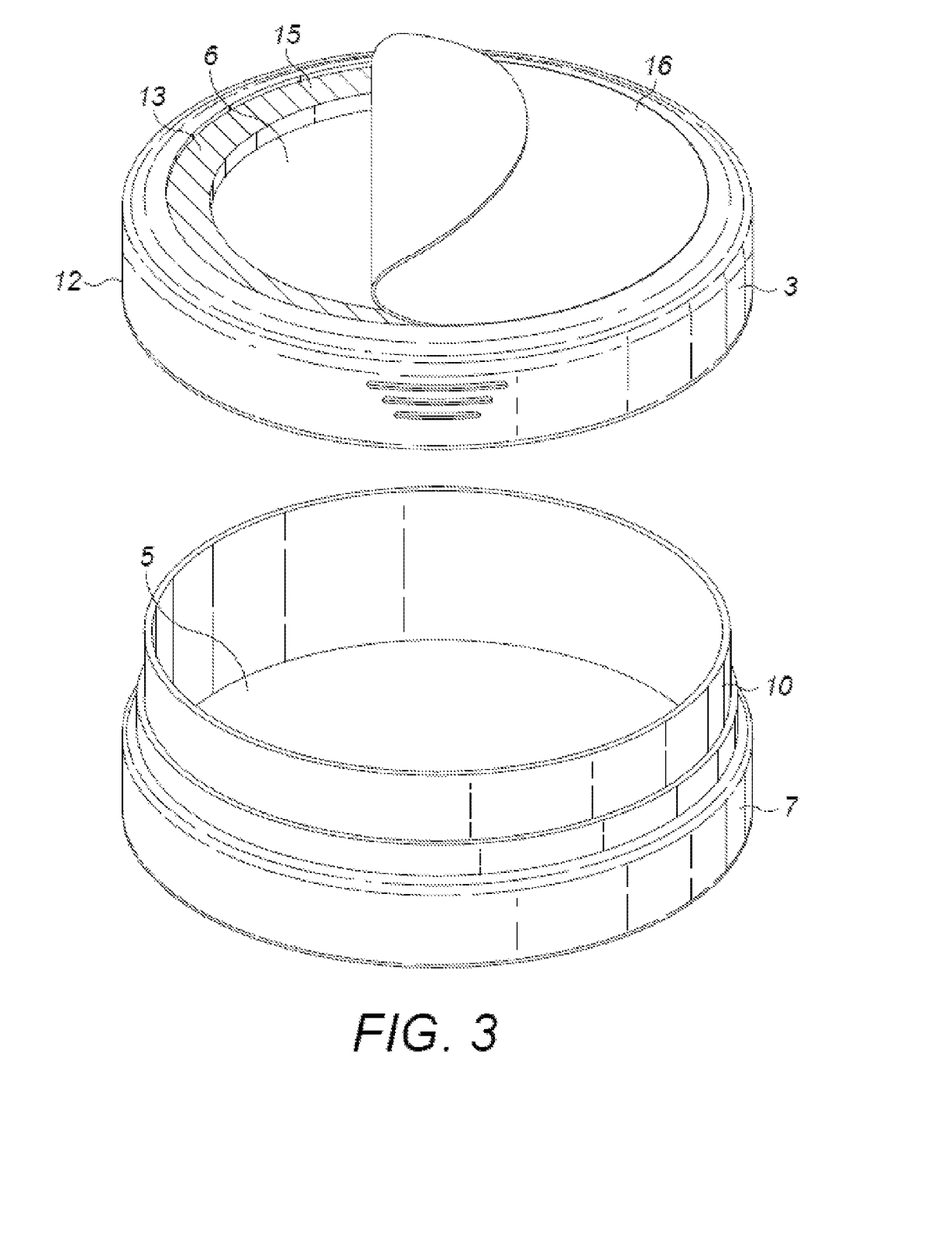
FIG. 3 shows the container of FIGS. 1 and 2 wherein a cover is partially detached from a lid to reveal a second compartment.

Although the cover 4 can be secured to the lid 3 in different ways, in a preferred embodiment, the cover 4 is secured on the receiving recessed lip 13 by a non-permanent re-usable adhesive 15. The term "re-usable" is used in the sense that the cover 4 may be repeatedly opened and closed without the adhesive losing its stickiness. In one embodiment, cover 4 may be flexible and be formed from a label or film so that it is peeled off as illustrated in FIG. 3. Alternatively, the cover may be rigid so that it must be pulled off the lid. In another embodiment, the cover 4 may include flexible film in addition to a rigid portion extending over the flexible film.

Although the lid preferably has a recessed lip 13 to receive the cover 4 flush on the lid 3, the cover 4 may also sit proud of the lid 3 and so the annular recess 13 is not essential.

As mentioned above, the disposal compartment may be formed in the base 7 instead of the lid 3, for example as shown in FIG. 7.

Figure 6:
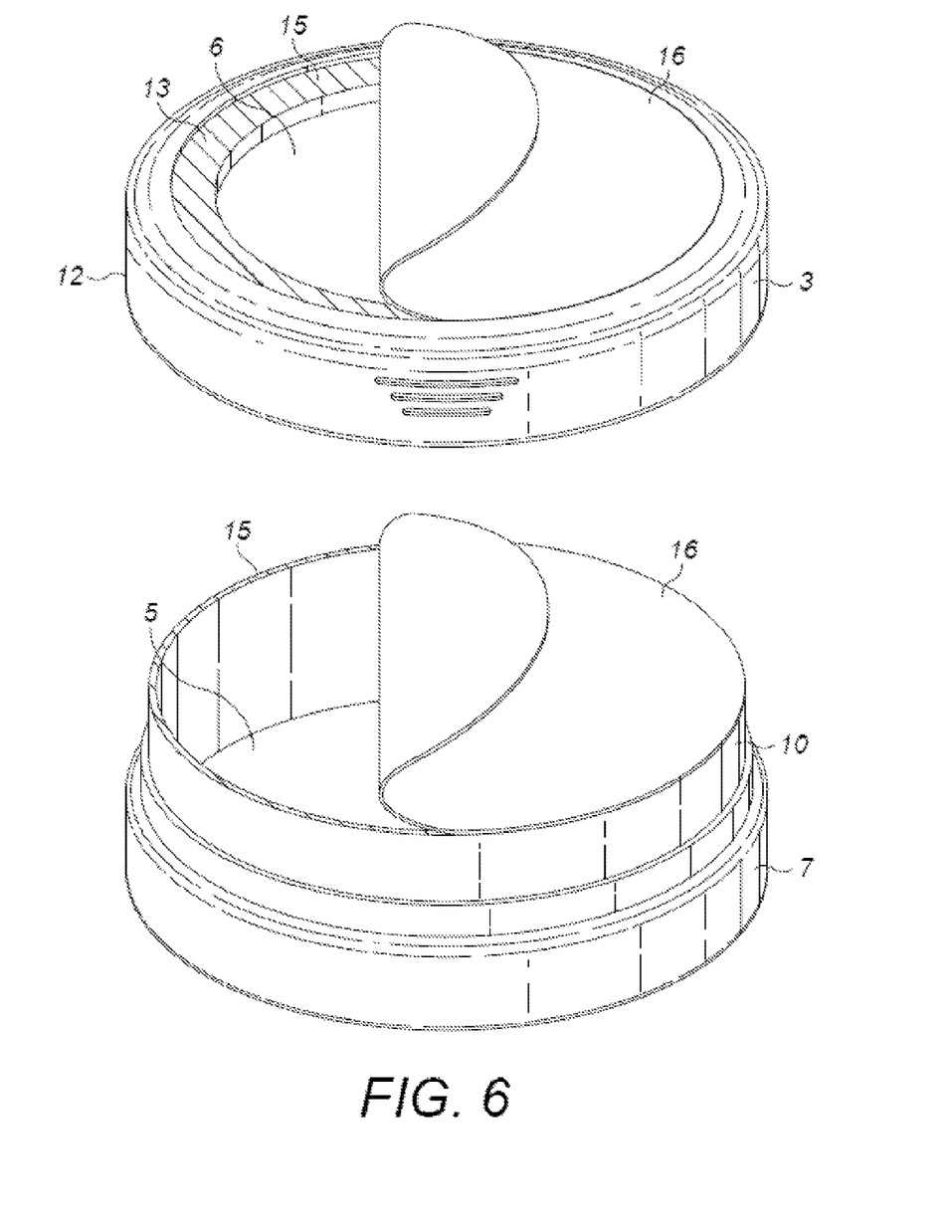
FIG. 6 shows the container of FIGS. 4 and 5 wherein flexible films are partially detached from each of a lid and a base to reveal first and second storage compartments.

If the disposal compartment is closed by a rigid cover 4, it may additionally have a flexible film or membrane 16 positioned beneath it which is secured using a reusable adhesive and which is peeled back after opening the cover, for example as depicted in FIGS. 3 and 6.

In another embodiment, a resealable adhesive film or label may be attached to the top of the base beneath the lid 3, as illustrated in FIG. 6. The adhesive film may then be peeled off the base 7 after removing the lid 3. It is envisaged that the film may be re-usable or immediately disposed of as the first portion of snus is retrieved. It should be realised that the adhesive film can be provided on the top of the base holding fresh snus, irrespective of whether the container has a second disposal compartment.

Figure 4:
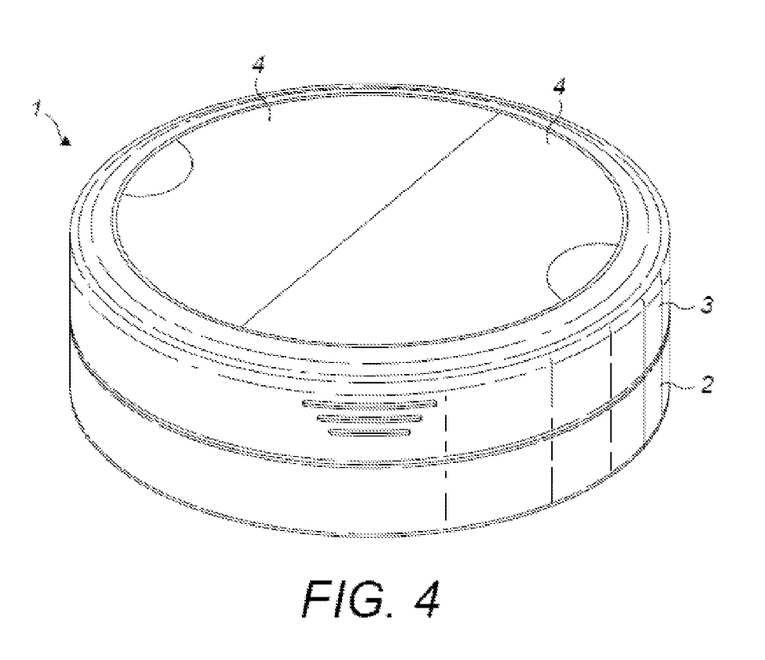
FIG. 4 shows a perspective view of a snus container according to an embodiment of the present invention.
Figure 5:
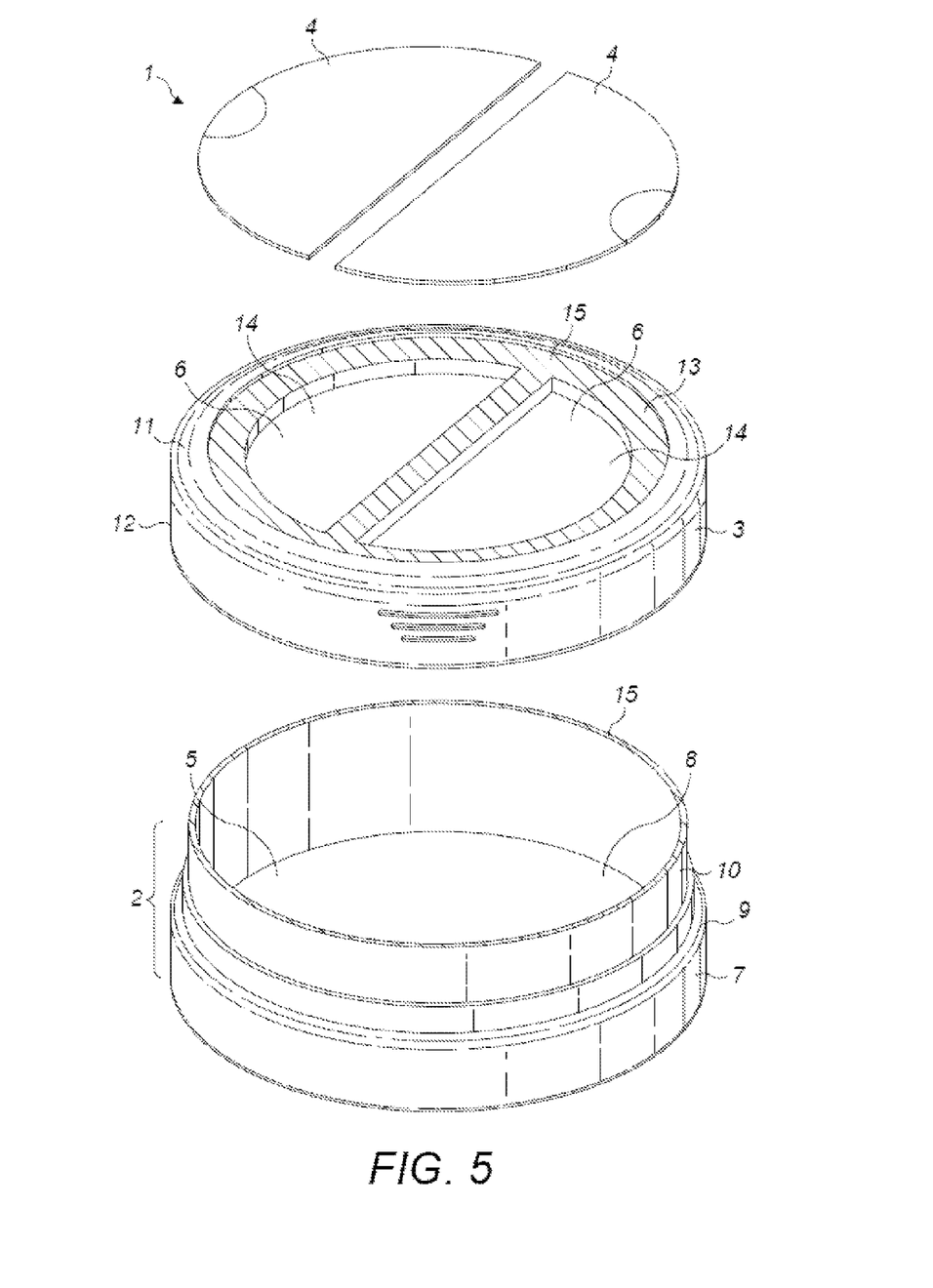
FIG. 5 shows an exploded view of the snus container of FIG. 4.

In an alternative embodiment, as shown in FIGS. 4 and 5, the disposal compartment may be divided into a plurality of compartments or spaces 6 and so the cover may also be divided into corresponding portions 4 or the cover may seal all compartments.

It will be appreciated that the container may assume a wide variety of shapes or that some components of the container will be shaped differently to the remaining components. For example, the cover may assume a different shape to the lid and the recessed lip providing that the horizontal dimensions of the cover fall within the boundaries of the lip. Alternatively, the outer boundaries of the lip may correspond to a non-circular cover.

The embodiments of the present invention in combination with the material used allows for the manufacturing costs to be reduced in comparison to containers where the cover is attached to the lid via a hinge. Moreover, the adhesive properties of the container provides advantages over containers comprising a cover clipped onto a second compartment of the lid as the adhesives maintain an improved seal as the cover is repeatedly detached. The described adhesive means closing a compartment holding fresh snus also prolongs the freshness of unused snus as the seal is more airtight than conventional containers.

The present invention therefore provides a snus container in which at least one of the base and lid or cover are coupled to each other with a reusable adhesive layer that retains its stickiness despite repeated opening and closing of the container and/or the disposal compartment.

Although embodiments of the invention have been shown and described, it will be appreciated by those skilled in the art that variations may be made to the above exemplary embodiments that lie within the scope of the invention, as defined in the following claims.

The invention claimed is:

1. A container comprising:
a base;
a lid defining a first snus storage compartment within the base;
a recess formed in an outer surface of the container;
a removable rigid cover attached to the container over the recess to define a second snus storage compartment; and
at least one of the following attachments:
the lid and the base are attached to each other by a non-permanent reusable adhesive; and
the removable rigid cover and the lid are attached to each other by a non-permanent reusable adhesive,
wherein the at least one attachment resealably closes at least one of said first snus storage compartment and second snus storage compartment;
wherein the recess is formed in an outer surface of the lid and the second snus storage compartment is defined between the lid and the removable rigid cover;
wherein the recess is encircled by a lip to which the removable rigid cover is releasably attached by the non-permanent reusable adhesive; and
wherein the lip is recessed, having a depth less than that of said recess and configured to receive the removable rigid cover flush with a surface of the lid.

2. The container according to claim 1,
wherein at least a region of a surface of at least one of the base and the lid includes a layer of the non-permanent reusable adhesive to allow the other of the base and the lid to be resealably adhered thereto.

3. The container according to claim 1,
wherein at least one of a region of a surface of the base, a region of a surface of the lid, and a region of the removable rigid cover includes a layer of the non-permanent reusable adhesive to allow at least one of the other of the base, the lid, and the removable rigid cover, to be releasably adhered thereto.

4. The container according to claim 1,
wherein a flexible film is disposed between the lid and the base and is releasably attached to one of the lid and the base using a non-permanent reusable adhesive.

5. The container according to claim 1
wherein a flexible film is disposed between the removable rigid cover and one of the lid and base, and is releasably attached to said one of the lid and base, and the removable rigid cover using a non-permanent reusable adhesive.

6. The container according to claim 1,
wherein the base and the lid are attached to each other by non-permanent reusable adhesive and also the removable rigid cover and the lid are attached to each other by the non-permanent reusable adhesive.

7. The container according to claim 1,
wherein the base comprises a bottom and a peripheral wall with an inner surface which is lined with a plastic component extending beyond said peripheral wall.

8. The container according to claim 7,
wherein the lid is retained on the base by the lid frictionally engaging with the extending part of the plastic component.

9. The container according to claim 1,
wherein the removable rigid cover is attached to the lid by the non-permanent reusable adhesive.

10. The container according to claim 1,
wherein the recess defining the second snus storage compartment is centrally located in the lid.

11. The container according to claim 1,
wherein the second snus storage compartment comprises a plurality of compartments.

12. The container according to claim 11,
wherein the removable rigid cover comprises a plurality of corresponding portions so as to cover the plurality of compartments in the space second snus storage compartment.

13. A container comprising:
a base;
a lid defining a first snus storage compartment within the base;
a recess formed in an outer surface of the container;
a removable rigid cover attached to the container over the recess to define a second snus storage compartment; and
at least one of the following attachments:
    the lid and the base are attached to each other by a non-permanent reusable adhesive; and
    the removable rigid cover and the base are attached to each other by a non-permanent reusable adhesive,
wherein the at least one attachment resealably closes at least one of said first snus storage compartment and second snus storage compartment;
wherein the recess is formed in an outer surface of the base and the second snus storage compartment is defined between the base and the removable rigid cover;
wherein the recess is encircled by a lip to which the removable rigid cover is releasably attached by the non-permanent reusable adhesive; and
wherein the lip is recessed, having a depth less than that of said recess and configured to receive the removable rigid cover flush with a surface of the lid.

14. The container according to claim 13,
wherein at least a region of a surface of at least one of the base and the lid includes a layer of the non-permanent reusable adhesive to allow the other of the base and the lid to be resealably adhered thereto.

15. The container according to claim 13,
wherein at least one of a region of a surface of the base, a region of a surface of the lid, and a region of the removable rigid cover includes a layer of the non-permanent reusable adhesive to allow at least one of the other of the base, the lid, and the removable rigid cover, to be releasably adhered thereto.

16. The container according to claim 13,
wherein a flexible film is disposed between the lid and the base and is releasably attached to one of the lid and the base using a non-permanent reusable adhesive.

17. The container according to claim 13,
wherein a flexible film is disposed between the removable rigid cover and the base, and is releasably attached to said base, and
wherein the removable rigid cover uses a non-permanent reusable adhesive.

18. The container according to claim 13,
wherein the base and the lid are attached to each other by non-permanent reusable adhesive and also the removable rigid cover and the base are attached to each other by the non-permanent reusable adhesive.

19. The container according to claim 13,
wherein the base comprises a bottom and a peripheral wall with an inner surface which is lined with a plastic component extending beyond said peripheral wall.

20. The container according to claim 19,
wherein the lid is retained on the base by the lid frictionally engaging with the extending part of the plastic component.

21. The container according to claim 13,
wherein the removable rigid cover is attached to the base by the non-permanent reusable adhesive.

22. The container according to claim 13,
wherein the recess defining the second snus storage compartment is centrally located in the base.

23. The container according to claim 13,
wherein the second snus storage compartment comprises a plurality of compartments.

24. The container according to claim 23,
wherein the removable rigid cover comprises a plurality of corresponding portions so as to cover the plurality of compartments in the space second snus storage compartment.

* * * * *